United States Patent
Cao

(10) Patent No.: US 10,256,714 B2
(45) Date of Patent: Apr. 9, 2019

(54) SNUBBER CIRCUIT

(71) Applicant: Shenzhen China Star Optoelectronics Technology Co., Ltd., Shenzhen, Guangdong (CN)

(72) Inventor: Dan Cao, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 338 days.

(21) Appl. No.: 14/909,111

(22) PCT Filed: Dec. 28, 2015

(86) PCT No.: PCT/CN2015/099202
§ 371 (c)(1),
(2) Date: Jan. 30, 2016

(87) PCT Pub. No.: WO2017/088241
PCT Pub. Date: Jun. 1, 2017

(65) Prior Publication Data
US 2017/0279346 A1 Sep. 28, 2017

(30) Foreign Application Priority Data
Nov. 26, 2015 (CN) .......................... 2015 1 0847714

(51) Int. Cl.
*H02M 1/08* (2006.01)
*H02M 1/34* (2007.01)
(Continued)

(52) U.S. Cl.
CPC ............... *H02M 1/34* (2013.01); *H02M 1/08* (2013.01); *H02M 1/44* (2013.01); *H02M 3/02* (2013.01);
(Continued)

(58) Field of Classification Search
CPC ............ H02M 1/14; H02M 1/15; H02M 1/22; H02M 1/44; H02M 3/00; H02M 3/02;
(Continued)

(56) References Cited

U.S. PATENT DOCUMENTS

2007/0211498 A1* 9/2007 Van Casteren ..... H02M 1/4208
363/16
2007/0263421 A1* 11/2007 Kyono .............. H02M 3/33592
363/127

(Continued)

*Primary Examiner* — Harry Behm
*Assistant Examiner* — Lorena Bruner
(74) *Attorney, Agent, or Firm* — Andrew C. Cheng

(57) ABSTRACT

The present disclosure provides a snubber circuit, wherein the snubber circuit is used to an electronic equipment including a pulse signal generator, a driving power source and a load, and the snubber circuit includes a current detection module, a control module and a snubber module. The current detection module is connected to the driving power source and detects the driving current of the driving power source. The control module is connected to the current detection module and the snubber module and adjusts a center frequency of the snubber module according to the driving current detected by the current detection module. The snubber module is connected to an output terminal of the pulse signal generator and filters the noise of the pulse signal. Therefore, the present disclosure may dynamically adjust a center frequency of a filtering, so as to increase a filtering performance and increase an efficiency of suppressing EMI.

16 Claims, 3 Drawing Sheets

(51) Int. Cl.
*H02M 1/44* (2007.01)
*H02M 3/02* (2006.01)
*H02M 1/00* (2006.01)

(52) U.S. Cl.
CPC ............... *H02M 2001/0009* (2013.01); *H02M 2001/342* (2013.01); *H02M 2001/344* (2013.01)

(58) Field of Classification Search
CPC .............. H02M 1/08; H02M 2001/344; H03H 11/0466; H03H 17/0289
See application file for complete search history.

(56) References Cited

U.S. PATENT DOCUMENTS

| | | | | |
|---|---|---|---|---|
| 2015/0137778 | A1* | 5/2015 | Miyazaki | H02M 3/156 323/271 |
| 2015/0381056 | A1* | 12/2015 | Hayakawa | H03K 17/164 363/21.15 |
| 2017/0104469 | A1* | 4/2017 | Mavretic | G01R 19/165 |

* cited by examiner

SNUBBER CIRCUIT

CROSS-REFERENCE TO RELATED APPLICATIONS

This application claims the benefit of, and priority to, Chinese Patent Application No. 201510847714.0, filed Nov. 26, 2015, titled "snubber circuit", the entire contents of which are incorporated by reference herein in its entirety.

FIELD OF THE INVENTION

The disclosure is related to electronic technology field, and more particular to a snubber circuit.

BACKGROUND OF THE INVENTION

The switching power supply with characteristics of small, light weight and high efficiency is widely used in various types of electronic equipments, and it has become indispensable. The switching power supply is divided to an AC switching power supply and a DC switching power supply. The DC switching power supply is used to transforms the original eco-power with poor quality (heavy electricity) to the DC voltage with high quality to be meet the requirement of the device (light electricity). It should be understood that the DC switching power supply mainly includes a DC/DC conventer and a transistor component. The DC/DC conventer is used to output a pulse signal, such as a square wave signal, so as to control a time rate for turning on or turning off the transistor component. Since the DC/DC conventer outputs the pulse signal with the high frequency, it may cause that the electromagnetic interference (EMI) appears when an output level varies from a low level to a high level, as shown by (A) in FIG. 1. In order to suppress EMI, an output terminal may be connected to a ground through a RC snubber, so as to filter a noise generated by EMI, as shown in FIG. 2.

It should be further understood that a center frequency of the RC snubber is related to a resistor R and a capacitor C and is unchanged, and an oscillating frequency of the noise is related to a magnitude of a load current and is varied dynamically. It should be noted that the center frequency of the RC snubber is equal to or similar to the oscillating frequency of the noise. It may effectively filter the noise, so as to achieve the best efficiency for suppressing EMI. As shown by (B) and (C) in FIG. 1, when a center frequency corresponding R1 and C1 equals to an oscillating frequency 2 and a center frequency corresponding R2 and C2 equals to an oscillating frequency 3, it may respectively achieve the best efficiency for suppressing EMI. However, the existing RC snubber can not dynamically adjust the center frequency of a filtering, such that the efficiency for suppressing EMI is worse.

SUMMARY OF THE INVENTION

The present disclosure provides a snubber circuit, thereby dynamically adjusting a center frequency of a filtering and increasing a filtering performance, so as to increase an efficiency of suppressing EMI.

The present disclosure provides a snubber circuit, and the snubber circuit is used to an electronic equipment including a pulse signal generator, a driving power source and a load. The pulse signal generator is used to input a pulse signal to an input terminal of the load, the driving power source is used to input a driving current to the input terminal of the load, the pulse signal generates a noise due to an electromagnetic interference, wherein the snubber circuit comprises a current detection module, a control module and a snubber module;

wherein the current detection module is connected to the driving power source and is used to detect the driving current of the driving power source;

wherein the control module is connected to the current detection module and the snubber module and is used to adjust a center frequency of the snubber module according to the driving current detected by the current detection module; and wherein the snubber module is connected to an output terminal of the pulse signal generator and is used to filter the noise of the pulse signal.

In a first embodiment of a first aspect, the snubber module includes a plurality of snubber units with different center frequencies;

wherein the control module is used to select one of the snubber units to start according to the driving current.

Combined with the first embodiment of the first aspect, in a second embodiment, the snubber module includes a first snubber unit, a second snubber unit and a third snubber unit, wherein center frequencies of the first snubber unit, the second snubber unit and the third snubber unit decrease in sequence.

Combined with the second embodiment of the first aspect, in a third embodiment, the current detection module includes a photo coupler, an anode of the photo coupler is connected to the driving power source, a cathode of the photo coupler is connected to the input terminal of the load, an emitter of the photo coupler is connected to an anode of a power source, and a collector of the photo coupler is connected to the control module.

Combined with the third embodiment of the first aspect, in a fourth embodiment, the control module includes a first comparator and a second comparator;

wherein a positive input terminal of the first comparator is connected to the collector of the photo coupler, a negative input terminal of the first comparator is connected to a first predetermined voltage, and an output terminal of the first comparator is connected to the first snubber unit and the third snubber unit; and wherein a positive input terminal of the second comparator is connected to the collector of the photo coupler, a negative input terminal of the second comparator is connected to a second predetermined voltage, and an output terminal of the second comparator is connected to the second snubber unit and the third snubber unit.

Combined with the fourth embodiment of the first aspect, in a fifth embodiment, the first snubber unit includes a first resistor, a first capacitor and a first field effect transistor, wherein one terminal of the first resistor is connected to the output terminal of the pulse signal generator, the other terminal of the first resistor is connected to one terminal of the first capacitor, the other terminal of the first capacitor is connected to a drain of the first field effect transistor, a gate of the first field effect transistor is connected to the output terminal of the first comparator, and a source of the first field effect transistor is connected to a ground.

Combined with the fourth embodiment of the first aspect, in a sixth embodiment, the second snubber unit includes a second resistor, a fourth resistor, a second capacitor, a second field effect transistor, a fourth field effect transistor and a fifth field effect transistor, wherein one terminal of the second resistor is connected to the output terminal of the pulse signal generator, the other terminal of the second resistor is connected to one terminal of the second capacitor, the other terminal of the second capacitor is connected to a drain of the second field effect transistor, a source of the second field effect transistor is connected to a ground, a gate of the second field effect transistor is connected to a drain of the fourth field effect transistor and a drain of the fifth field effect transistor, the source of the second field effect transistor is further connected to a source of the fourthe field effect transistor and a source of the fifth field effect transistor, a gate of the fourth field effect transistor is connected to the output terminal of the first comparator, a gate of the fifth field effect transistor is connected to the output terminal of the second comparator, one terminal of the fourth resistor is connected to the anode of the power source, the other terminal of the fourth resistor is connected to the drain of the fourth field effect transistor and the drain of the fifth field effect transistor.

Combined with the fourth embodiment of the first aspect, in a seventh embodiment, the third snubber unit includes a third resistor, a third capacitor and a third field effect transistor, wherein one terminal of the third resistor is connected to the output terminal of the pulse signal generator, the other terminal of the third resistor is connected to one terminal of the third capacitor, the other terminal of the third capacitor is connected to a drain of the third field effect transistor, a gate of the third field effect transistor is connected to the output terminal of the second comparator, and a source of the third field effect transistor is connected to a ground.

Combined with the third embodiment of the first aspect, in a eighth embodiment, the current detection module includes a fifth resistor and a sixth resistor, wherein the collector of the photo coupler is connected to a ground through the fifth resistor, and the emitter of the photo coupler is connected to the anode of the power source through the sixth resistor.

Combined with the first aspect and any one of the first embodiment to the eighth embodiment of the first aspect, the electronic equipment is a direct current switching power supply, the pulse signal generator is a DC/DC converter, and the load is a transistor component.

In summary, the snubber circuit of the embodiment of the present disclosure includes the current detection module, the control module and the snubber module, wherein the current detection module is used to detect the driving current of the driving power source. The driving current is related to the load current, and the oscillating frequency of the noise of the pulse signal is related to the load current. The control module is used to adjust the center frequency of the snubber module according to the driving current. The snubber module is used to filter the noise of the pulse signal. Therefore, it may dynamically adjust the center frequency of the filtering according to the oscillating frequency, so as to increasing the filtering performance and increasing the efficiency for suppressing EMI.

BRIEF DESCRIPTION OF THE DRAWINGS

In order to more clearly illustrate the prior art or the embodiments or aspects of the practice of the disclosure, the accompanying drawings for illustrating the prior art or the embodiments of the disclosure are briefly described as below. It is apparently that the drawings described below are merely some embodiments of the disclosure, and those skilled in the art may derive other drawings according the drawings described below without creative endeavor.

DETAILED DESCRIPTION

The following description with reference to the accompanying drawings is provided to clearly and completely explain the exemplary embodiments of the present disclosure. It is apparent that the following embodiments are merely some embodiments of the present disclosure rather than all embodiments of the present disclosure. According to the embodiments in the present disclosure, all the other embodiments attainable by those skilled in the art without creative endeavor belong to the protection scope of the present disclosure.

In the embodiment of the present disclosure, a snubber circuit is used to an electronic equipment including a pulse signal generator, a driving power source and a load, wherein the pulse signal generator is used to input a pulse signal, such as a square wave signal, to an input terminal of the load. The driving power source is used to input a driving current to the input terminal of the load, so as to compensate the current outputted by the pulse signal generator, thereby sufficiently driving the load. It should be understood that when the pulse signal generator outputs the pulse signal with a high frequency, if a linear component exists in the load, EMI may be generated when the output level varies from the low level to the high level, and thus the pulse signal generates a noise. The function of the snubber circuit is used to filter the noise of the pulse signal and decreases an impact of EMI on the pulse signal.

Figure 1:
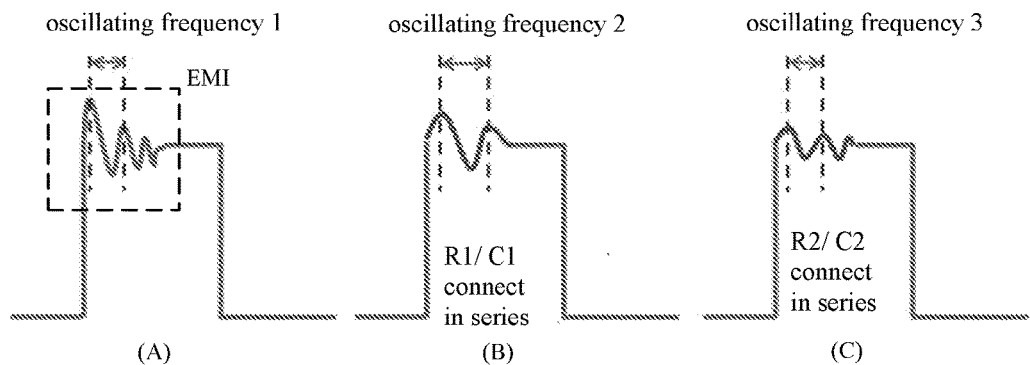
FIG. 1 is a schematic view of a pulse signal according to an embodiment of the present disclosure.
Figure 2:
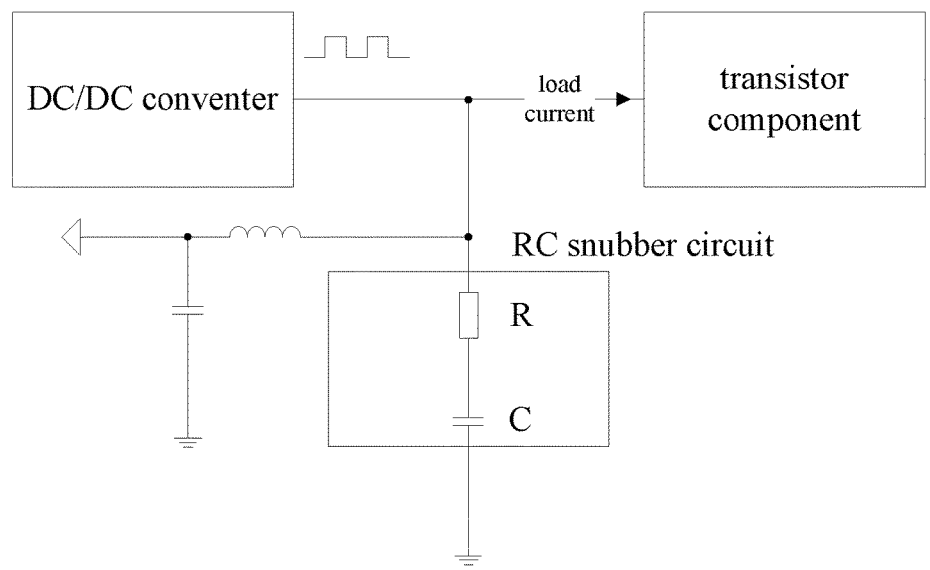
FIG. 2 is a structure schematic view of a RC snubber circuit according to an embodiment of the present disclosure.
Figure 3:
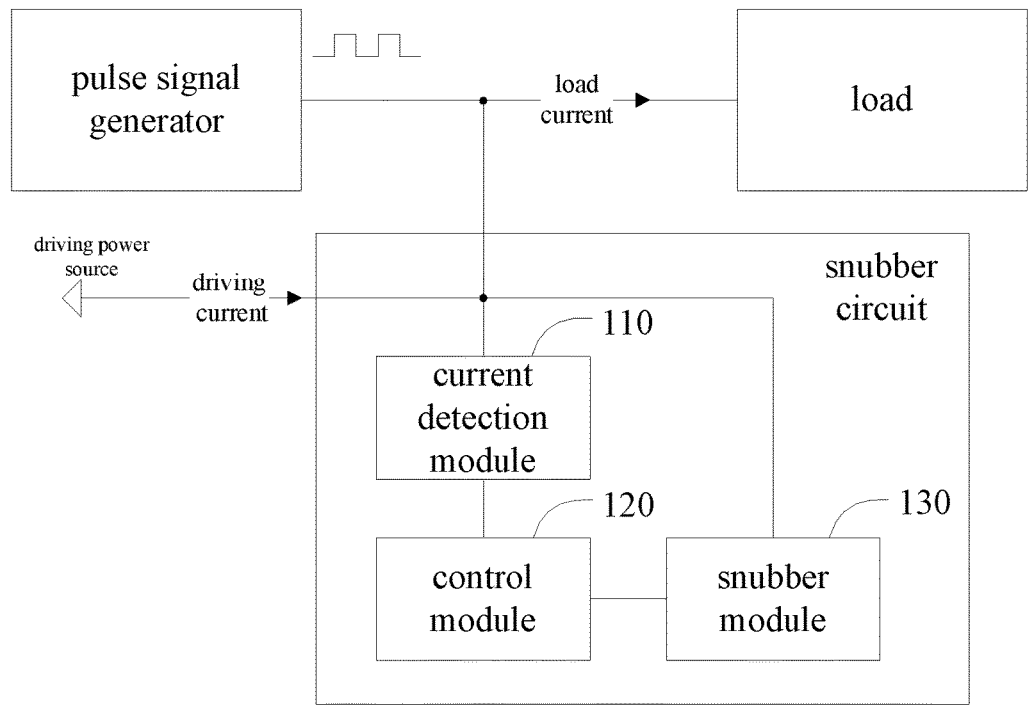
FIG. 3 is a structure schematic view of a snubber circuit according to an embodiment of the present disclosure.

FIG. 3 is a structure schematic view of a snubber circuit according to an embodiment of the present disclosure. As shown in FIG. 3, in the embodiment of present disclosure, the snubber circuit includes a current detection module 110, a control module 120 and a snubber module 130.

The current detection module 110 is connected to a driving power source and is used to detect a driving current outputted by the driving power source. As shown in FIG. 3, a load current is a current of an input terminal of an input load. According to the principle for generating EMI, an oscillating frequency of a noise in a pulse signal is related to the load current, i.e. the load current is larger, and the oscillating frequency is higher. Further, the load current equals to a sum of a current outputted by a pulse signal generator and the driving current outputted by the driving power source. With respect to the driving current, a variation of the current outputted by the pulse signal generator may be omitted, so as to obtain a positive relationship of a variation of the driving current and a variation of the load current. Visibly, the purpose for detecting the driving current by the current detection module 110 is that a magnitude of the load current may indirectly evaluated by a magnitude of the driving current.

The control module 120 is connected to the current detection module 110 and the snubber module 130, and the control module 120 is used to adjust a center frequency of the snubber module 130 according to the driving current detected by the current detection module 110. Specifically, the control module 120 determines the oscillating frequency of the noise of the pulse signal according to the driving current, so as to adjust the center frequency of the snubber module 130 to be equal or about equal to the oscillation frequency.

The snubber module 130 is connected to an output terminal of the pulse signal generator and is used to filter the noise of the pulse signal. It should be understood that after adjusting the snubber module 130, the center frequency of the snubber module 130 is equal to or about equal to the oscillation frequency, thus the effect for filtering the noise is the best.

Figure 4:
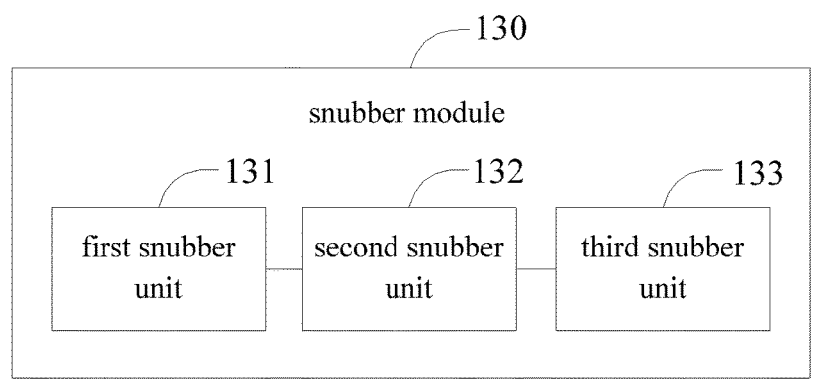
FIG. 4 is a structure schematic view of a snubber module according to an embodiment of the present disclosure.

In an optional embodiment, the snubber module 130 includes a plurality of snubber units with different center frequencies. Correspondingly, the control module 120 is used to select one of the snubber units to start according to the driving current, and the started snubber unit may be used to filter the noise of the pulse signal. Further optionally, as shown in FIG. 4, the snubber module 130 includes a first snubber unit 131, a second snubber unit 132 and a third snubber unit 133, wherein center frequencies of the first snubber unit 131, the second snubber unit 132 and the third snubber unit 133 decrease in sequence. In the specific implementation process, the control module 120 determines the oscillating frequency of the noise according to the driving current, so as to determine one snubber unit with the center frequency closest to the oscillating frequency from the first snubber unit 131, the second snubber unit 132 and the third snubber unit 133 and start the snubber unit.

In summary, the snubber circuit of the embodiment of the present disclosure includes the current detection module 110, the control module 120 and the snubber module 130, wherein the current detection module 110 is used to detect the driving current of the driving power source. The driving current is related to the load current, and the oscillating frequency of the noise of the pulse signal is related to the load current. The control module 120 is used to adjust the center frequency of the snubber module 130 according to the driving current. The snubber module 130 is used to filter the noise of the pulse signal. Therefore, it may dynamically adjust the center frequency of the filtering according to the oscillating frequency, so as to increasing the filtering performance and increasing the efficiency for suppressing EMI.

Figure 5:
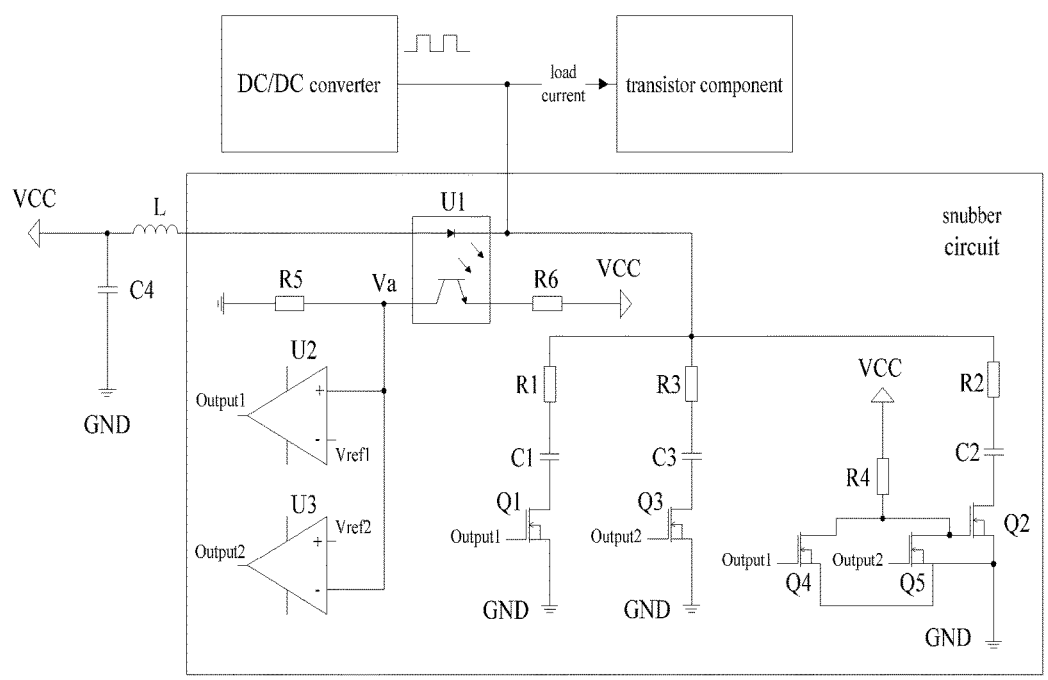
FIG. 5 is a structure schematic view of a snubber circuit according to another embodiment of the present disclosure.

FIG. 5 is a structure schematic view of a snubber circuit according to another embodiment of the present disclosure. The snubber circuit further describes the details of each of the modules of the snubber circuit in FIG. 3. The snubber unit 130 includes a first snubber unit 131, a second snubber unit 132 and a third snubber unit 133, and an electronic equipment is a direct current switching power supply, a pulse signal generator is a DC/DC converter, and a load is a transistor component.

Specifically, the current detection module 110 may include a photo coupler U1, wherein an anode of the photo coupler U1 is connected to the driving power source, a cathode of the photo coupler U1 is connected to the input terminal of the transistor component, an emitter of the photo coupler U1 is connected to an anode of a power source.

In the specific implementation process, the photo coupler U1 detects a magnitude of the driving current, and the driving current is larger, a voltage Va of the collector of the photo coupler U1 is larger; otherwise Va is smaller. Optionally, the current detection module 110 includes a fifth resistor R5 and a sixth resistor R6, wherein the collector of the photo coupler U1 is connected to a ground through the fifth resistor R5, and the emitter of the photo coupler U1 is connected to the anode of the power source through the sixth resistor R6. The fifth resistor R5 and the sixth resistor R6 may have a function of the voltage division and current limiting. When protecting the photo coupler U1, Va with the variation of the driving current is more obvious.

Further, the control module 120 may include a first comparator U2 and a second comparator U3, wherein a positive input terminal of the first comparator U2 is connected to the collector of the photo coupler U1, a negative input terminal of the first comparator U2 is connected to a first predetermined voltage Vref1; a positive input terminal of the second comparator U3 is connected to the collector of the photo coupler U1, a negative input terminal of the second comparator U3 is connected to a second predetermined voltage Vref2. The second predetermined voltage Vref2 is less than the first predetermined voltage Vref1. It should be understood that when the voltage of the positive input terminal of the comparator is greater than the voltage of the negative input terminal of the comparator, the comparator outputs a high level; otherwise, the comparator outputs a low level.

In the specific implementation process, when Va>Vref1>Vref2, an output terminal of the first comparator U2 outputs the high level, and an output terminal of the second comparator U3 outputs the low level; when Vref1>Va>Vref2, the output terminal of the first comparator U2 and the output terminal of the second comparator U3 output the low level; when Vref1>Vref2>Va, the output terminal of the first comparator U2 outputs the low level, and the output terminal of the second comparator U3 outputs the high level.

Further, the first snubber unit 131 may include a first resistor R1, a first capacitor C1 and a first field effect transistor Q1, wherein one terminal of the first resistor R1 is connected to the output terminal of the DC/DC converter, the other terminal of the first resistor R1 is connected to one terminal of the first capacitor C1, the other terminal of the first capacitor C1 is connected to a drain of the first field effect transistor Q1, a gate of the first field effect transistor Q1 is connected to the output terminal of the first comparator U2, and a source of the first field effect transistor Q1 is connected to a ground. The second snubber unit 132 may include a second resistor R2, a fourth resistor R4, a second capacitor C2, a second field effect transistor Q2, a fourth field effect transistor Q4 and a fifth field effect transistor Q5, wherein one terminal of the second resistor R2 is connected to the output terminal of the DC/DC converter, the other terminal of the second resistor R2 is connected to one terminal of the second capacitor C2, the other terminal of the second capacitor C2 is connected to a drain of the second field effect transistor Q2, a source of the second field effect transistor Q2 is connected to a ground, a gate of the second field effect transistor Q2 is connected to a drain of the fourth field effect transistor Q4 and a drain of the fifth field effect transistor Q5, the source of the second field effect transistor Q2 is further connected to a source of the fourthe field effect transistor Q4 and a source of the fifth field effect transistor Q5, a gate of the fourth field effect transistor Q4 is connected to the output terminal of the first comparator U2, a gate of the fifth effect transistor Q5 is connected to the output terminal of the second comparator U3, one terminal of the fourth resistor R4 is connected to the anode of the power source, the other terminal of the fourth resistor R4 is connected to the drain of the fourth field effect transistor Q4 and the drain of the fifth field effect transistor Q5. The third snubber unit 133 may include a third resistor R3, a third capacitor C3 and a third field effect transistor Q3, wherein one terminal of the third resistor R3 is connected to the output terminal of the DC/DC convenrter, the other terminal of the third resistor R3 is connected to one terminal of the third capacitor C3, the other terminal of the third capacitor C3 is connected to a drain of the third field effect transistor Q3, a gate of the third field effect transistor Q3 is connected to the output terminal of the second comparator Q2, and a source of the third field effect transistor Q3 is connected to a ground.

In the specific implementation process, when the output terminal of the first comparator U1 outputs the high level and the output terminal of the second comparator U2 outputs the low level, the first field effect transistor Q1 and the fourth field effect transistor Q4 are turned on, the second field effect transistor Q2, the third field effect transistor Q3 and the fifth field effect transistor Q5 are turned off, thus the RC circuit of the first snubber unit 131 is started, such that the first resistor R1 and the first capacitor C1 connected in series to the ground are used to filter the noise. When the output terminal of the first comparator U1 and the output terminal of the second comparator U2 output the low level, the second field effect transistor Q2 is turned on, the first field effect transistor Q1, the third field effect transistor Q3, the fourth field effect transistor Q4 and the fifth field effect transistor Q5 are turned off, thus the RC circuit of the first snubber unit 132 is started, such that the second resistor R2 and the second capacitor C2 connected in series to the ground are used to filter the noise. When the output terminal of the first comparator U1 outputs the low level and the output terminal of the second comparator U2 outputs the high level, the third field effect transistor Q3 and the fifth field effect transistor Q5 are turned on, first field effect transistor Q1, the second field effect transistor Q2 and the the fourth field effect transistor Q4 are turned off, thus the RC circuit of the first snubber unit 133 is started, such that the third resistor R3 and the third capacitor C3 connected in series to the ground are used to filter the noise. Visibly, when the driving current is at different ranges, the used snubber unit is different, thereby dynamically adjusting the center frequency of the filtering.

The snubber circuit of the embodiment of the present disclosure includes the current detection module, the control module and the snubber module, wherein the current detection module is used to detect the driving current of the driving power source. The driving current is related to the load current, and the oscillating frequency of the noise of the pulse signal is related to the load current. The control module is used to adjust the center frequency of the snubber module according to the driving current. The snubber module is used to filter the noise of the pulse signal. Therefore, it may dynamically adjust the center frequency of the filtering according to the oscillating frequency, so as to increasing the filtering performance and increasing the efficiency for suppressing EMI.

Those skilled in the art can understand that all or part of processes of the above embodiments may be implemented by the hardware related to the command through the computer program stored in a computer readable storage medium, and when the program is performed, it may include the process of each of the embodiments. The computer readable storage medium may be magnetic disc, optical disc, read-only memory (ROM), random access memory (RAM), etc.

The above disclosure is merely an embodiment of the disclosure and does not intend to limit the claim scope of the disclosure. Therefore, it may conduct equivalent variation on the claims of the disclosure, which belongs to the scope covered by the disclosure.

What is claimed is:

1. A snubber circuit, wherein the snubber circuit is used in electronic equipment comprising: a pulse signal generator, a driving power source and a load; wherein the pulse signal generator is used to input a pulse signal to an input terminal of the load; the driving power source is used to input a driving current to the input terminal of the load; the pulse signal generates a noise due to an electromagnetic interference, wherein the snubber circuit comprises a current detection module, a control module and a snubber module;
    wherein the current detection module is connected to the driving power source, is used to detect the driving current of the driving power source, and comprises a photo coupler, wherein an anode of the photo coupler is connected to the driving power source, a cathode of the photo coupler is connected to the input terminal of the load, an emitter of the photo coupler is connected to an anode of a power source, and a collector of the photo coupler is connected to the control module;
    wherein the control module is connected to the current detection module and the snubber module and is used to adjust a center frequency of the snubber module according to the driving current detected by the current detection module; and
    wherein the snubber module is connected to an output terminal of the pulse signal generator and is used to filter the noise of the pulse signal.

2. The snubber circuit according to claim 1, wherein the snubber module comprises a plurality of snubber units with different center frequencies;
    wherein the control module is used to select one of the snubber units to start according to the driving current.

3. The snubber circuit according to claim 2, wherein the snubber module comprises a first snubber unit, a second snubber unit and a third snubber unit, wherein center frequencies of the first snubber unit, the second snubber unit and the third snubber unit decrease in sequence.

4. The snubber circuit according to claim 3, wherein the control module comprises a first comparator and a second comparator;
    wherein a positive input terminal of the first comparator is connected to the collector of the photo coupler, a negative input terminal of the first comparator is connected to a first predetermined voltage, and an output terminal of the first comparator is connected to the first snubber unit and the third snubber unit; and
    wherein a positive input terminal of the second comparator is connected to the collector of the photo coupler, a negative input terminal of the second comparator is connected to a second predetermined voltage, and an output terminal of the second comparator is connected to the second snubber unit and the third snubber unit.

5. The snubber circuit according to claim 4, wherein the first snubber unit comprises a first resistor, a first capacitor and a first field effect transistor, wherein one terminal of the first resistor is connected to the output terminal of the pulse signal generator, the other terminal of the first resistor is connected to one terminal of the first capacitor, the other terminal of the first capacitor is connected to a drain of the first field effect transistor, a gate of the first field effect transistor is connected to the output terminal of the first comparator, and a source of the first field effect transistor is connected to a ground.

6. The snubber circuit according to claim 5, wherein the electronic equipment is a direct current switching power supply, the pulse signal generator is a DC/DC converter, and the load is a transistor component.

7. The snubber circuit according to claim 4, wherein the second snubber unit comprises a second resistor, a fourth resistor, a second capacitor, a second field effect transistor, a fourth field effect transistor and a fifth field effect transistor, wherein one terminal of the second resistor is connected to the output terminal of the pulse signal generator, the other terminal of the second resistor is connected to one terminal of the second capacitor, the other terminal of the second capacitor is connected to a drain of the second field effect transistor, a source of the second field effect transistor is connected to a ground, a gate of the second field effect transistor is connected to a drain of the fourth field effect transistor and a drain of the fifth field effect transistor, the source of the second field effect transistor is further connected to a source of the fourth field effect transistor and a source of the fifth field effect transistor, a gate of the fourth field effect transistor is connected to the output terminal of the first comparator, a gate of the fifth field effect transistor is connected to the output terminal of the second comparator, one terminal of the fourth resistor is connected to the anode of the power source, the other terminal of the fourth resistor is connected to the drain of the fourth field effect transistor and the drain of the fifth field effect transistor.

8. The snubber circuit according to claim 7, wherein the electronic equipment is a direct current switching power supply, the pulse signal generator is a DC/DC converter, and the load is a transistor component.

9. The snubber circuit according to claim 4, wherein the third snubber unit comprises a third resistor, a third capacitor and a third field effect transistor, wherein one terminal of the third resistor is connected to the output terminal of the pulse signal generator, the other terminal of the third resistor is connected to one terminal of the third capacitor, the other terminal of the third capacitor is connected to a drain of the third field effect transistor, a gate of the third field effect transistor is connected to the output terminal of the second comparator, and a source of the third field effect transistor is connected to a ground.

10. The snubber circuit according to claim 9, wherein the electronic equipment is a direct current switching power supply, the pulse signal generator is a DC/DC converter, and the load is a transistor component.

11. The snubber circuit according to claim 4, wherein the electronic equipment is a direct current switching power supply, the pulse signal generator is a DC/DC converter, and the load is a transistor component.

12. The snubber circuit according to claim 3, wherein the electronic equipment is a direct current switching power supply, the pulse signal generator is a DC/DC converter, and the load is a transistor component.

13. The snubber circuit according to claim 2, wherein the electronic equipment is a direct current switching power supply, the pulse signal generator is a DC/DC converter, and the load is a transistor component.

14. The snubber circuit according to claim 1, wherein the current detection module further comprises a fifth resistor and a sixth resistor, wherein the collector of the photo coupler is connected to a ground through the fifth resistor, and the emitter of the photo coupler is connected to the anode of the power source through the sixth resistor.

15. The snubber circuit according to claim 14, wherein the electronic equipment is a direct current switching power supply, the pulse signal generator is a DC/DC converter, and the load is a transistor component.

16. The snubber circuit according to claim 1, wherein the electronic equipment is a direct current switching power supply, the pulse signal generator is a DC/DC converter, and the load is a transistor component.

* * * * *